United States Patent [19]

Flynn

[11] Patent Number: 4,753,343
[45] Date of Patent: Jun. 28, 1988

[54] AUDIO DISC STORAGE CONTAINER WITH SLIDABLE, APERTURED WALL

[76] Inventor: John M. Flynn, 17737 Highland, Tinley Park, Ill. 60477

[21] Appl. No.: 86,957

[22] Filed: Aug. 19, 1987

[51] Int. Cl.$^4$ .................... B65D 43/20; B65D 85/57
[52] U.S. Cl. .................... 206/307; 206/816; 211/40; 220/349; 220/350; 312/15; 312/285; 312/297
[58] Field of Search ................... 312/9–11, 312/15, 17, 297, 295, 285, 283, 12; 206/307, 309, 310, 445, 816; 211/40; 220/20, 345, 349, 350

[56] References Cited

U.S. PATENT DOCUMENTS

| | | | |
|---|---|---|---|
| 1,955,835 | 4/1934 | Samstag | 220/350 |
| 2,214,993 | 9/1940 | De Witt | 220/20 |
| 2,412,332 | 12/1946 | Hansen | 220/20 X |
| 2,899,074 | 8/1959 | Gullixson | 211/40 |
| 3,170,741 | 2/1965 | Richards, Jr. | 312/285 X |
| 3,692,376 | 9/1972 | McKinsey | 312/11 |
| 3,963,287 | 6/1976 | Rumble | 312/285 X |
| 4,162,024 | 7/1979 | Shanley | 220/350 |
| 4,465,187 | 8/1984 | Kinard et al. | 220/350 X |
| 4,655,345 | 4/1987 | Drake et al. | 206/309 |

FOREIGN PATENT DOCUMENTS 205585  6/1939  Switzerland .................. 312/10

Primary Examiner—Stephen Marcus
Assistant Examiner—Bryon Gehman

[57] ABSTRACT

An audio disc storage container having a movable flexible, transparent wall which allows inspection of the contents, the wall having an aperture provided in it to permit insertion and removal of audio discs. The aperture in the wall may be aligned with a seal member to prevent the entrance of contaminants into the storage container which may damage the discs.

6 Claims, 1 Drawing Sheet

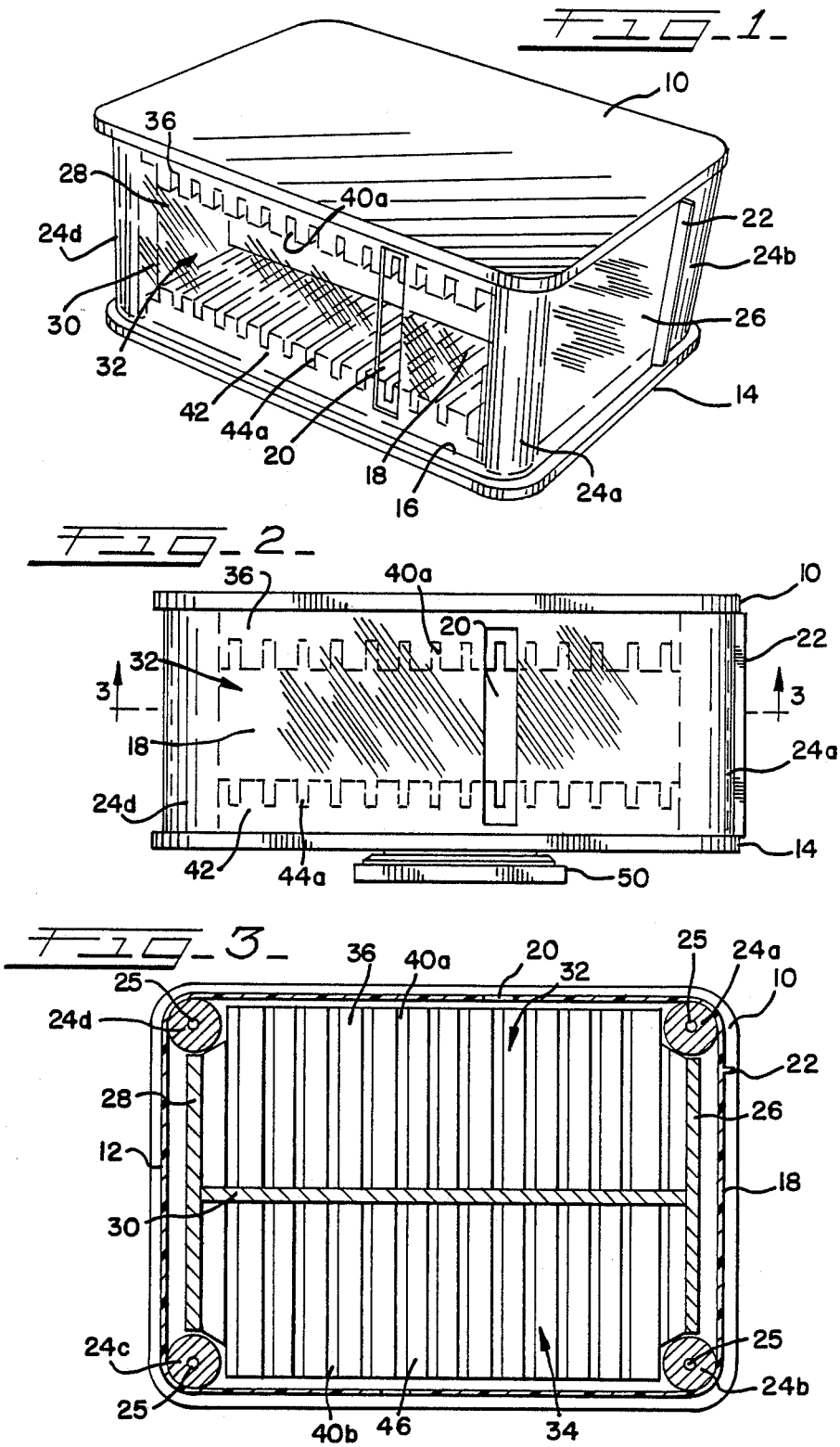

AUDIO DISC STORAGE CONTAINER WITH SLIDABLE, APERTURED WALL

BACKGROUND OF THE INVENTION

The present invention provides an audio disc storage container. Numerous arrangements of this general type are shown in the prior art patents U.S. Pat. Nos. 1,191,003, 1,322,681, 3,069,213, 3,692,376, 3,736,036 and 3,765,738. None of these arrangements discloses the use of a rotatable transparent enclosure wall having an aperture for insertion and removal of audio discs, which aperture may be aligned with a seal to prevent the entrance of contaminants into the storage container or a handle to facilitate relocation of the aperture.

SUMMARY OF THE INVENTION

The present invention provides an audio disc storage container having a slidably movable, flexible, transparent wall with a handle to facilitate rotation of the wall. An aperture is provided in the wall so that audio discs may be easily inserted and removed. The wall may be rotated so that the aperture is sealed thereby preventing contaminants from entering the container and damaging the discs.

BRIEF DESCRIPTION OF THE DRAWINGS

FIG. 1 shows a perspective view of the audio disc storage container of the present invention.

FIG. 2 shows a front view of the audio disc storage container shown in FIG. 1.

FIG. 3 is a sectioned view taken along the lines 3—3 of FIG. 2 looking upward into the storage container.

DETAILED DESCRIPTION OF THE INVENTION

An audio disc storage container is shown in FIGS. 1 and 2. The storage container may be constructed of wood, plastic or any other suitable material. A substantially rectangular top member 10 is provided, the top member 10 having defined around the periphery of its bottom surface a groove 12, shown in FIG. 3. A bottom member 14 is illustrated lying in a plane parallel to and spaced apart from said top member 10 and substantially identical thereto. A groove 16 is defined in the upper surface of the bottom member 14 about its periphery in register with the groove 12 in the top member 10.

A movable, flexible wall 18 extends between the top member 10 and the bottom member 14 enclosing the periphery of the storage container and defining a storage chamber therein. The flexible wall 18 is formed of a transparent plastic material so as to allow inspection of the contents of the storage container. The upper edge of the flexible wall 18 is slidably disposed in the groove 12 in the top member 10. Likewise, the lower edge of the flexible wall 18 is slidably disposed in the groove 16 of the bottom member 14. The grooves 12 and 16 form a track within which the flexible wall 18 slides.

A substantially rectangular-shaped, vertically disposed aperture 20 is defined in the flexible wall 18 to provide access to the contents of the storage container so as to enable insertion or removal of discs from the storage container. The drawings illustrate a single aperture 20 but it is possible to provide two such apertures spaced 180 degrees apart in the wall. The aperture 20 extends from just below the upper edge of the flexible wall 18 to just above the lower edge of the flexible wall 18 so that the aperture 20 is sized to provide sufficient room to insert or remove a disc. The width of the aperture 20 is sized so that it is wide enough for the fingers of a human hand to be inserted therein to grasp a disc when removing the disc from the storage container or to insert a disc therein. A handle 22 extends outwardly from the flexible wall 18 and is adapted to facilitate movement of the flexible wall 18 about the periphery of the storage container.

A plurality of substantially cylindrical rollers 24, illustrated as 24a, 24b, 24c and 24d in FIG. 3, are supported between the top member 10 and the bottom member 14 at the corners of the storage container. The rollers 24 are positioned so as to engage the interior surface of the flexible wall 18 and to support the flexible wall 18 for movement along the rollers 24. The rollers 24 are rotatably mounted between the top member 10 and the bottom member 14 by means of a plurality of pins 25, one of which is inserted into the center of each end of each roller 24 and then inserted into the corresponding top member 10 or the corresponding bottom member 14. When the aperture 20 in the flexible wall 18 is rotated into alignment with a roller 24, a seal is formed, thereby preventing the entry of contaminants into the storage container.

A side wall 26, shown in FIG. 3, is positioned between the roller 24a and the roller 24b. The side wall 26 is vertically disposed between the top member 10 and the bottom member 14 inside the groove 12 and the groove 16. Likewise, a side wall 28 is provided between the roller 24c and the roller 24d, also vertically disposed between the top member 10 and the bottom member 14. A center wall member 30 is vertically disposed between the top member 10 and the bottom member 14 and extends across the middle of the storage container between side wall 26 and side wall 28, thereby separating the storage container into a pair of storage chambers 32 and 34, as best seen in FIG. 3. The top member 10 and the bottom member 14 are securely fastened to the side walls 26 and 28 and the center wall 30 by a plurality of screws (not shown) or other suitable fasteners.

Secured to the underside of the top member 10 of the storage chamber 32 is an upper cushion 36 defining a plurality of slots 40a therein, the slots 40a being perpendicular to the plane of the top member 10. Secured to the upper surface of the bottom member 14 of the storage chamber 32 is a lower cushion 42 defining a plurality of slots 44a therein, the slots 44a in the lower cushion 42 being perpendicular to the plane of the bottom member 14 and the slots 44a being in register with the slots 40a defined in the upper cushion 36. Likewise, as seen in FIG. 3, an upper cushion 46, substantially identical to the upper cushion 36, and defining a plurality of slots 40b therein, is connected to the underside of the top member 10 of the storage chamber 34. A lower cushion (not shown) substantially identical to the lower cushion 42 and defining a plurality of slots therein, is connected to the upper side of the bottom member 14 in the storage chamber 34. The corresponding slots 40 and 44 are sized to grippingly engage an audio disc and to prevent excessive movement and rattling of the discs. A base member 50, shown in FIG. 2, is rotatably mounted to the bottom of the bottom member 14 so as to allow rotation of the storage container about the base member 50.

In operation, when it is desired to remove or insert a disc into the storage compartment, the handle 22 is grasped and the flexible wall 18 moved in the grooves 12 and 16 about the periphery of the storage container until the aperture 20 is aligned with a pair of corresponding slots 40 and 44 in which the desired disc is stored. Preferably the slots will be individually numbered and the owner of the container will have an inventory list indicating which discs are stored in which slots. At this point, the disc may be removed from the slots 40 and 44 through the aperture 20. After the disc has been removed, the flexible wall 18 may be moved by applying force to the handle 22 until the aperture 20 is aligned with one of the rollers 24 thereby providing a seal to prevent dust or other contaminants from entering the storage container.

Although only one aperture 20 is shown in the drawings as previously mentioned, another aperture may be provided spaced 180° from the aperture 20. That way, the flexible wall 18 would not have to be moved so far in order to remove or insert a disc when the aperture 20 is on the side of the storage container opposite the side where the desired disc is located or the side opposite where the slots in which the disc desired to be inserted is located. Likewise, an additional handle substantially identical to the handle 22 may also be provided. The storage containers may be stacked one on top of the other in order to accommodate a large collection of audio discs.

Although the above description describes a storage container for audio discs, the present invention may also be adapted and sized in order to accommodate not only compact discs but stereo records, reel-to-reel tapes and dual cassette tapes. In addition, the storage container may be adapted to accommodate video tapes, as VCR tapes or Betamax tapes.

Thus it has been shown that the present invention provides a storage container having a flexible, transparent wall with an aperture provided therein for insertion or removal of audio discs where the flexible wall is slidably disposed within the storage container.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. An enclosed storage container including a top member, a bottom member lying in a plane parallel to and spaced apart from said top member, an upper cushion connected to said top member defining a plurality of slots therein, a lower cushion connected to said bottom member, said lower cushion defining a plurality of slots therein, said slots being in register with said slots defined in said upper cushion, a movable, flexible wall slidably disposed between said top and bottom members enclosing the periphery of said container and defining a storage chamber therein, said wall operative to seal and protect the contents of said storage chamber from entry of dust and other contaminants, an aperture defined in said flexible wall adapted to provide access to the contents of said storage chamber so as to enable insertion or removal of discs to or from said storage chamber, a plurality of rollers mounted between said top and bottom members, said rollers positioned so as to engage the interior surface of said movable wall and to support said wall for movement about said rollers whereby any one of said rollers, when aligned with said aperture is operative to seal said aperture and prevent the entry of contaminants into said storage container and whereby said aperture in said movable wall can be moved away from said roller and positioned at any desired point about the periphery of said storage chamber to provide access to an individual disc and then moved back into register with said roller.

2. A storage container as in claim 1 in which said movable, flexible wall is formed of a transparent, plastic material so as to allow inspection of the contents of said container.

3. A storage container as in claim 1 including a groove defined in said top member around its periphery and a corresponding groove defined in said bottom member about its periphery in register with said groove in said top member, said grooves operative to form a track within which said flexible wall is slidably disposed.

4. A storage container as in claim 1 including a handle extending outwardly from said flexible wall adapted to facilitate movement of said wall member.

5. A storage container as in claim 1 including a center wall member disposed between said top and bottom members separating said storage container into a pair of storage chambers.

6. A storage container as in claim 1 including a base member rotatably connected to said bottom member so as to allow rotation of said container about said base member.

* * * * *